(12) United States Patent
Chen et al.

(10) Patent No.: US 8,673,246 B2
(45) Date of Patent: Mar. 18, 2014

(54) PROCESS FOR CONTACTING ONE OR MORE FLUIDS AND A REACTOR RELATING THERETO

(75) Inventors: Pengfei Chen, Des Plaines, IL (US); Zhanping Xu, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 154 days.

(21) Appl. No.: 13/069,535

(22) Filed: Mar. 23, 2011

(65) Prior Publication Data

US 2012/0241006 A1   Sep. 27, 2012

(51) Int. Cl.
*B01J 8/00* (2006.01)
*B01J 10/00* (2006.01)

(52) U.S. Cl.
USPC ........... 422/648; 422/607; 422/220; 422/224; 261/108; 261/114.1; 261/114.3; 261/114.5; 137/1

(58) Field of Classification Search
USPC .................. 422/607, 648, 220, 224; 261/108, 261/114.1, 114.3, 114.5; 137/1
See application file for complete search history.

(56) References Cited

U.S. PATENT DOCUMENTS

| | | | |
|---|---|---|---|
| 3,433,600 A * | 3/1969 | Christensen et al. ......... 422/607 |
| 4,836,989 A | 6/1989 | Aly et al. |
| 5,635,145 A | 6/1997 | Den Hartog et al. |
| 5,837,208 A | 11/1998 | Grott et al. |
| 5,935,413 A | 8/1999 | Boyd et al. |
| 5,989,502 A | 11/1999 | Nelson et al. |
| 6,180,068 B1 | 1/2001 | Boyd et al. |
| 6,183,702 B1 | 2/2001 | Nguyen et al. |
| 6,645,437 B1 | 11/2003 | Gauthier et al. |
| 6,769,672 B2 | 8/2004 | Mueller |
| 6,905,112 B2 | 6/2005 | Konijn et al. |
| 7,045,103 B2 | 5/2006 | McDougald et al. |
| 7,052,654 B2 * | 5/2006 | McDougald et al. ......... 422/605 |
| 7,078,002 B2 | 7/2006 | Van Vliet et al. |
| 7,112,312 B2 | 9/2006 | Chou |
| 7,122,162 B2 | 10/2006 | Raynal et al. |
| 7,261,120 B2 | 8/2007 | Mueller |
| 7,601,310 B2 | 10/2009 | Breivik et al. |

FOREIGN PATENT DOCUMENTS

WO   2004000433 A2   12/2003

* cited by examiner

*Primary Examiner* — Lessanework Seifu

(74) *Attorney, Agent, or Firm* — Mark R Willis

(57) ABSTRACT

One exemplary embodiment can be a process for contacting one or more fluids in a vessel. The process may include passing one or more fluids into a chamber from an overhead tray and providing a conduit outside the chamber coupling a respective spillway to a respective hole for increasing contact time inside the conduit. Typically, the chamber forms one or more sidewalls forming at least one hole and the overhead tray forms at least one spillway.

12 Claims, 4 Drawing Sheets

PROCESS FOR CONTACTING ONE OR MORE FLUIDS AND A REACTOR RELATING THERETO

FIELD OF THE INVENTION

This invention generally relates to a process for contacting one or more fluids, and a reactor relating thereto.

DESCRIPTION OF THE RELATED ART

Often, a reactor includes various internal mechanisms therein. Typically, a reactor having a plurality of beds can also include mechanisms, such as mixing devices and distribution trays, to mix and redistribute effluent passing from one catalyst bed to the next.

Typically, an external quench gas is introduced between catalyst beds for cooling an effluent falling from the bed above. The quench gas and the effluent are mixed to evenly distribute temperatures and compositions. Generally, mixing is more difficult with mixed phases of gas and liquid due to their differing densities. The quality of the mixing may depend on the contacting time and area of the two phases. Usually, the gas and liquid flow into a mixing box from a tray and then flow tangentially thereby creating a vortex. The gas and liquid can leave the mixing box through a center outlet.

Unfortunately, gas and liquid flow from the tray can tend to promptly separate due to the large density differential between the gas and liquid. Although not wanting to be bound by theory, it is believed that the gas is mostly within the inner portion of a vortex while the liquid is pushed to the periphery, and thus, contact between the liquid and gas may be very limited. Hence, there is a desire to more efficiently mix different phases.

SUMMARY OF THE INVENTION

One exemplary embodiment can be a process for contacting one or more fluids in a vessel. The process may include passing one or more fluids into a chamber from an overhead tray and providing a conduit outside the chamber coupling a respective spillway to a respective hole for increasing contact time and area inside the conduit and the chamber. Typically, the chamber forms one or more sidewalls forming at least one hole and the overhead tray forms at least one spillway.

Another exemplary embodiment may be a process for contacting one or more fluids including a vapor and a liquid in a vessel. Usually, the process includes passing the one or more fluids into a reactor, providing the one or more fluids to a first catalyst bed, recovering the one or more fluids on a collection tray that may form at least one spillway, providing at least one conduit, and providing one or more fluids to a distribution tray positioned underneath the mixing chamber and above a second catalyst bed. Generally, the at least one conduit includes a first arm and a second arm coupled at an elbow, the first arm is coupled to the collection tray around the at least one spillway, and the second arm terminates to communicate the one or more fluids from the collection tray to a mixing chamber.

Yet another exemplary embodiment can be a reactor. Typically, the reactor can include a first catalyst bed, a collection tray forming a spillway positioned underneath the first catalyst bed, a mixing chamber having a bottom member and one or more sidewalls, and a conduit forming a tube communicating the spillway with a hole. Usually, the one or more sidewalls are coupled to a periphery of the bottom member and the one or more sidewalls form the hole.

The embodiments disclosed herein can provide a conduit for effectively mixing fluids in a vessel. Particularly, the conduits can communicate fluids collecting on a tray in a reactor, typically after a first catalyst bed, and route the fluids through a conduit that can be inside or outside of a chamber. In one exemplary embodiment, one or more vanes can be positioned within the conduit to facilitate mixing therein. Thus, the embodiments herein can improve vapor-liquid contacting area and increase contact time inside the conduit and the chamber.

DEFINITIONS

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of at least generally about 50%, and preferably about 70%, by mole, of a compound or class of compounds in a stream.

As used herein, the term "substantially" can mean an amount of at least generally about 80%, preferably about 90%, and optimally about 99%, by mole, of a compound or class of compounds in a stream.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g., a screw, a nail, a staple, or a rivet; an adhesive; or a solder.

As used herein, the term "fluid" can mean a liquid or a gas.

As used herein the term "fluids" can mean one or more liquids and/or gases.

As used herein, the term "vapor" can mean a gas or a dispersion that may include or consist of hydrogen and one or more hydrocarbons. Often, a vapor may include a gas containing hydrocarbon liquid droplets.

DETAILED DESCRIPTION

Figure 1:
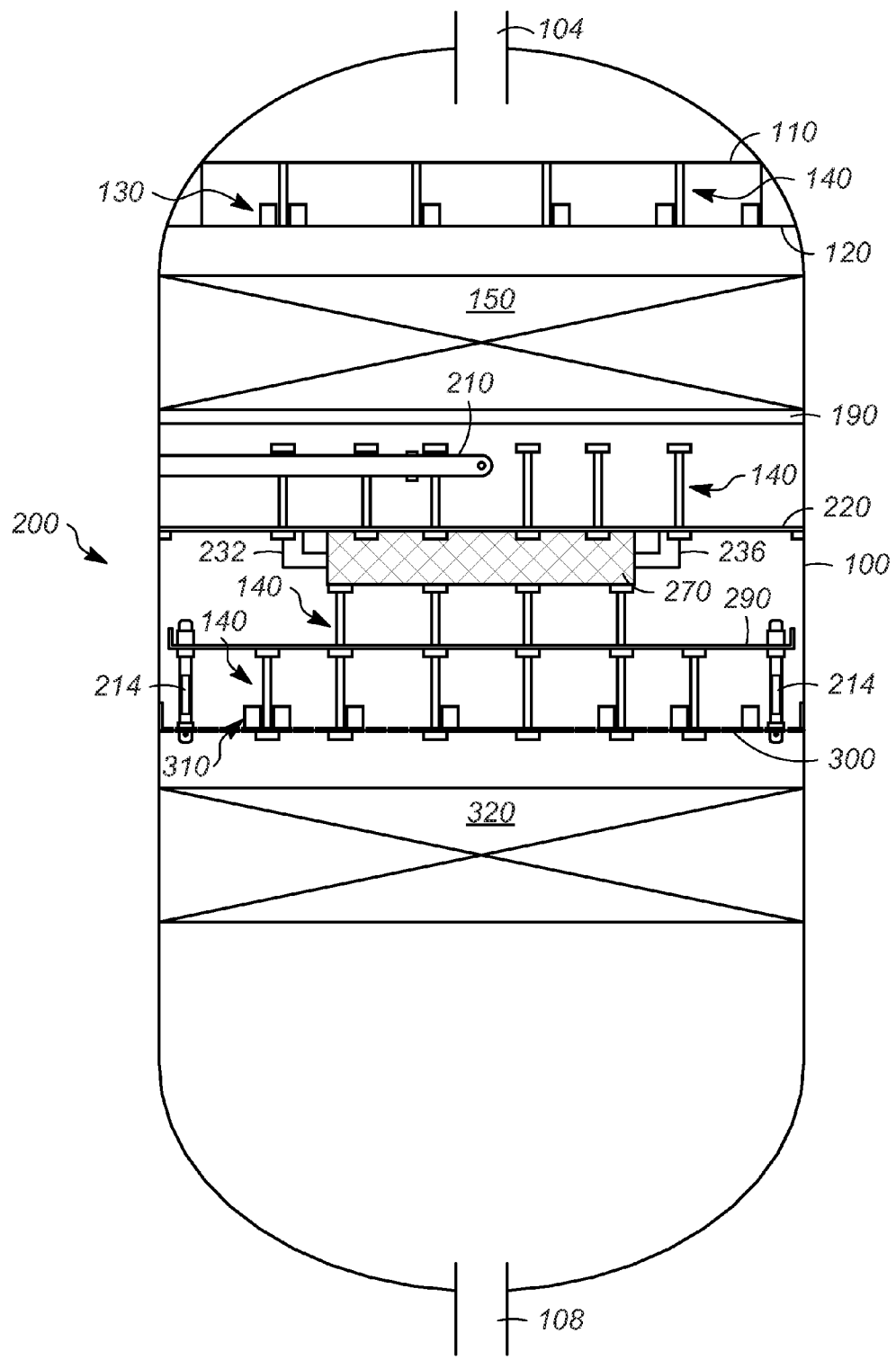
FIG. 1 is an elevational, schematic depiction of an exemplary vessel depicting internal components.

Referring to FIG. 1, an exemplary vessel or reactor 100 can include an inlet 104 and an outlet 108. Typically, the vessel 100 can be utilized for hydroprocessing reactions and can receive a multitude of fluids. Often, the vessel 100 can receive a liquid as well as one or more, typically a plurality, of vapors.

Generally, the vessel or reactor 100 can be any suitable hydroprocessing reactor, such as disclosed in, e.g., U.S. Pat. No. 4,937,051.

The vessel 100 can contain a first distribution or rough distribution tray 110, a second distribution tray or redistribution tray 120, a plurality of downcomers 130, a series of support beams or trusses 140 at various elevations, a first catalyst bed 150, a quenching and/or mixing zone 200, and a second catalyst bed 320. Generally, the vessel 100 can contain the quenching and/or mixing zone 200 between the first and second catalyst beds 150 and 320. Although two catalyst beds 150 and 320 are depicted, it should be understood that any number of catalyst beds can be used with optionally corresponding quenching and/or mixing zones positioned between. Moreover, it should be understood that other vessel configurations can be used, such as fluid being provided directly to the first catalyst bed 150 from the inlet 104 or a catalyst bed receiving a fluid from an above quenching and/or mixing zone 200.

The first distribution tray 110 can be coupled to the second distribution tray 120 by the series of support beams or trusses 140 using any suitable means such as mechanical fasteners. The plurality of downcomers 130 can form tubes and be positioned within holes in the second distribution tray 120. Generally, incoming fluids passing through the inlet 104 can be distributed through the plurality of downcomers 130 past the second distribution tray 120. Although six downcomers 130 are depicted, it should be understood that any suitable number of downcomers 130 may be utilized. In other exemplary embodiments, the downcomers 130 can be positioned symmetrically and uniformly on the second distribution tray 120.

Afterwards, the fluids can pass through the first catalyst bed 150 supported by a catalyst support tray 190. Generally, the reactants can produce products that fall downward. Typically, the catalyst support tray 190 has openings therein for allowing fluids to pass there-through.

The quenching and/or mixing zone 200 can include a quench distributor 210, supports 214, a collection tray 220, a chamber or mixing chamber 270, a first or rough distribution tray 290, a second or redistribution tray 300, and a plurality of downcomers 310. Although seven downcomers 310 are depicted, it should be understood that any suitable number of downcomers 310 may be utilized. In other exemplary embodiments, the downcomers 310 can be positioned symmetrically and uniformly on the second distribution tray 300.

Generally, the collection tray 220, the mixing chamber 270, first distribution tray 290, and the second distribution tray 300 can be buttressed by a series of support beams or trusses 140 and supports 214. Conduits 232 and 236 can communicate fluids from the collection tray 220 to the mixing chamber 270, as hereinafter described.

Usually, the quench gas and products passing from the first catalyst bed 150 can pass through the mixing or quench zone 200 to be mixed and redistributed, and then pass to the second catalyst bed 320. Afterwards, products from the second catalyst bed 320 can exit through the outlet 108. In other exemplary embodiments, products may pass through one or more other quench and/or mixing zones before exiting the outlet 108.

Figure 2:
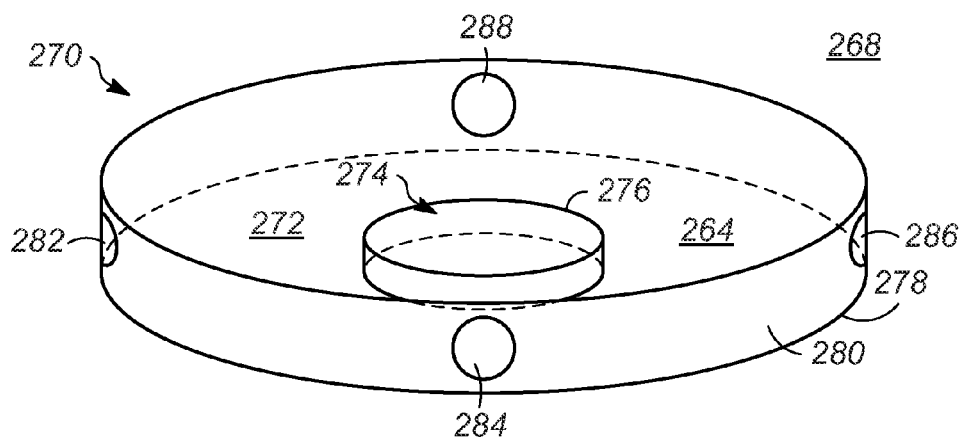
FIG. 2 is a perspective view of an exemplary chamber.
Figure 3:
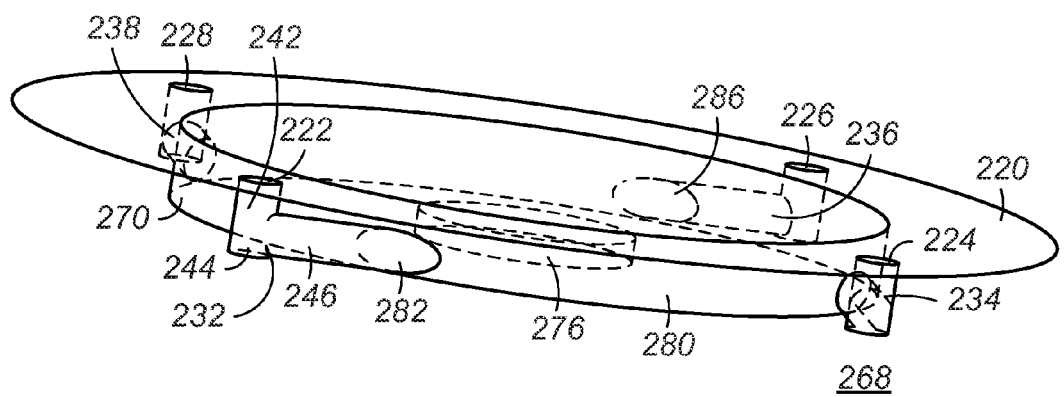
FIG. 3 is a perspective view of an exemplary collection tray coupled to an exemplary chamber.
Figure 4:
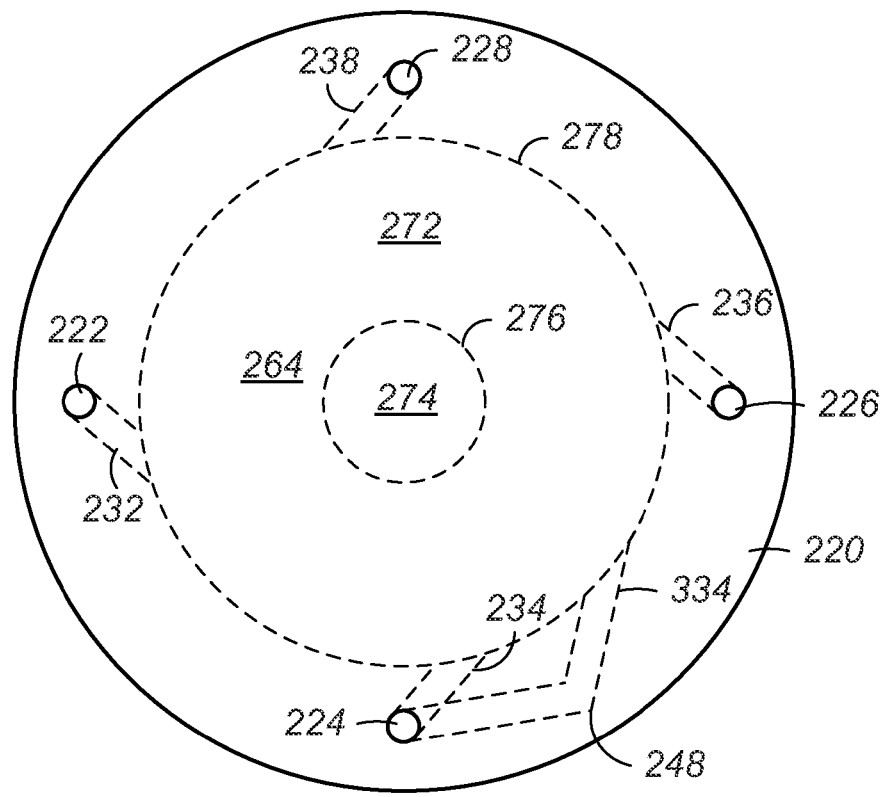
FIG. 4 is a top, plan view of an exemplary collection tray depicting the conduits and chamber in phantom.

Referring to FIGS. 2-4, an exemplary mixing chamber 270 that can have any suitable shape typically forms a substantially right circular cylinder. In the drawings, not all elements are depicted in all the figures due to the differing views obscuring some of the elements. The mixing chamber may include a bottom member 272 surrounding an opening 274 and one or more sidewalls 280. Typically, a weir 276 can surround the opening 274, which is typically circular. The bottom member 272 can form or have a periphery 278 surrounded by the one or more sidewalls 280. Generally, the one or more sidewalls 280 can form at least one hole, typically a first hole 282, a second hole 284, a third hole 286, and a fourth hole 288. Generally, the mixing chamber 270 can include an interior or inside 264, and an exterior or outside 268.

Typically, the weir 276 and the one or more sidewalls 280 can be coupled to the bottom member 272 using any suitable means, such as mechanical fasteners or welds. In addition, the mixing chamber 270 can be coupled to the collection tray, utilizing any suitable means, such as mechanical fasteners or welds. Typically, fluid, such as one or more liquid or vapor phases, can collect on the top surface of the collection tray 220. The collection tray 220, which may be substantially circular, can form at least one spillway, namely a first spillway 222, a second spillway 224, a third spillway 226 and a fourth spillway 228.

Generally, one or more, such as a plurality, of conduits, namely a first conduit 232, a second conduit 234, a third conduit 236, and a fourth conduit 238, can be coupled to a respective spillway 222, 224, 226, and 228 and communicate the top surface of the collection tray 220 with the mixing chamber 270 at a respective first hole 282, second hole 284, third hole 286, and fourth hole 288. Although four conduits 232, 234, 236, and 238 are disclosed, any suitable number conduits may be used. As the conduits can be substantially identical, only the first conduit 232 will be discussed in detail herein. It should be understood that the conduits can be the same or different.

The first conduit 232 can include a first arm 242 terminating in an elbow 244 that connects to a second arm 246. Typically, the elbow 244 can position the first arm 242 at about a 90° angle with respect to the second arm 246, although any suitable angle may be used, such as an angle of up to about 180°. Thus, the elbow 244 forms a substantially 90° angle between the first arm 242 and the second arm 246 in this exemplary embodiment. Generally, the first arm 242 is coupled at one end proximate to the first spillway 222 and the second arm 246 is coupled at the other end proximate to the first hole 282. The first conduit 232 can be coupled to the collection tray 220 and the mixing chamber 270 using any suitable means such as mechanical fasteners or welds. Usually, the first conduit 232 can collect one or more fluids from the collection tray 220 and communicate them to the mixing chamber 270.

In operation, one or more fluids can collect on the collection tray 220 and enter the first conduit 232. The first conduit 232 can be positioned entirely outside 268 of the mixing chamber 270. One or more fluids exiting the first conduit 232 can flow tangentially to the one or more sidewalls 280 and mix in the interior 264 and flow over the weir 276 and exit the opening 274.

To enhance mixing between phases in the mixing chamber 270, the vapor and quench gas as well as the liquid can flow together into the bottom of the mixing chamber 270 through four spillways 222, 224, 226, and 228. The vapor-liquid contact time and contact area can be increased by vapor-liquid concurrent flow inside the conduits 232, 234, 236, and 238, and vapor-liquid cross flow inside the mixing chamber 270. As gas density is typically lower than liquid, gas can rise through the circulating liquid inside the mixing chamber 270, thereby increasing vapor-liquid contacting. The conduits 232, 234, 236, and 238 can take various shapes, such as straight or curved, to enhance mixing of the fluid phases. The horizontal portion of the conduits 232, 234, 236, and 238 can be long or short but should follow the liquid flow inside the mixing chamber 270 so its effect on liquid rotation in the interior 264 is minimized.

In an alternative embodiment as depicted in FIG. 4, the first conduit 232 can be replaced by another version of a conduit 334. In this exemplary version, the conduit 334 in addition to including a first arm and a second arm, can include a bend 248 in the second arm. The bend 248 can be at any suitable angle in a horizontal plane, such as at least about 90°. It should be understood that any suitable shape can be utilized with a conduit.

Figure 5:
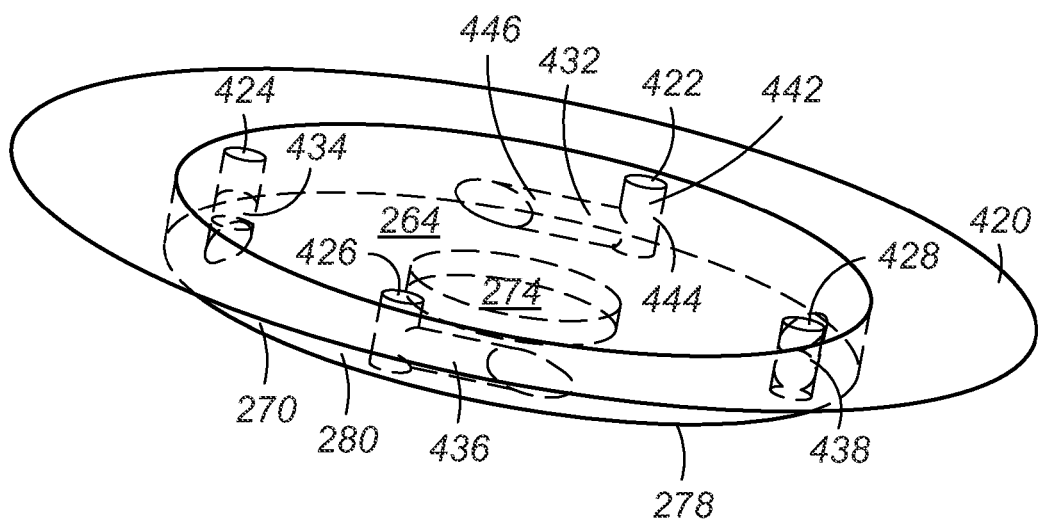
FIG. 5 is a perspective view of another exemplary collection tray coupled to another exemplary chamber.

Referring to FIG. 5, another exemplary embodiment of a collection tray 420 can include one or more spillways, preferably a first spillway 422, a second spillway 424, a third spillway 426, and a fourth spillway 428. The dimensions of the collection tray 420 can be substantially similar to the collection tray 220, as described above. In this exemplary embodiment, the one or more spillways 422, 424, 426, and 428 can be formed over the mixing chamber 270 inside the periphery 278. Thus, one or more, such as a plurality of, conduits can be provided, namely a first conduit 432, a second conduit 434, a third conduit 436, and a fourth conduit 438. The conduits can be the same or different, but in this exemplary embodiment the conduits 432, 434, 436, and 438 can be substantially the same and substantially similar to the first conduit 232, as discussed above, with a first arm 442 and a second arm 446 coupled at an elbow 444 for, e.g., the conduit 432.

In operation, only the first conduit 432 will be discussed hereinafter. One or more fluids can collect on the collection tray 420 and enter the first conduit 432. The first conduit 432 can be positioned entirely in the interior 264 of the mixing chamber 270. One or more fluids exiting the first conduit 432 can flow tangentially to the one or more sidewalls 280 and mix in the interior 264 and flow over the weir 276 and exit the opening 274.

Figure 6:
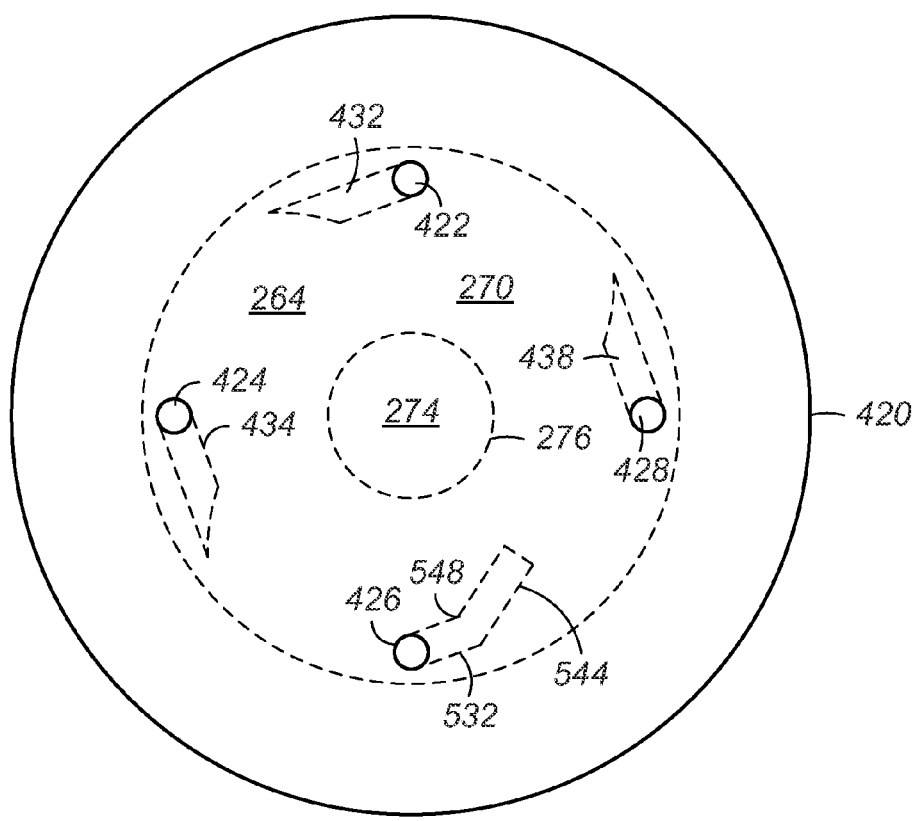
FIG. 6 is a top, plan view of another exemplary collection tray depicting the conduits and chamber in phantom.

Referring to FIG. 6, another view of the mixing chamber 270 and the collection tray 420 are depicted. The conduit 436 has been replaced with a conduit 532. The conduit 532 is substantially similar to the conduit 334 as described above, namely a second arm 544 of the conduit 532 forms a bend 548 similar to the bend 248 of the conduit 334.

Figure 7:
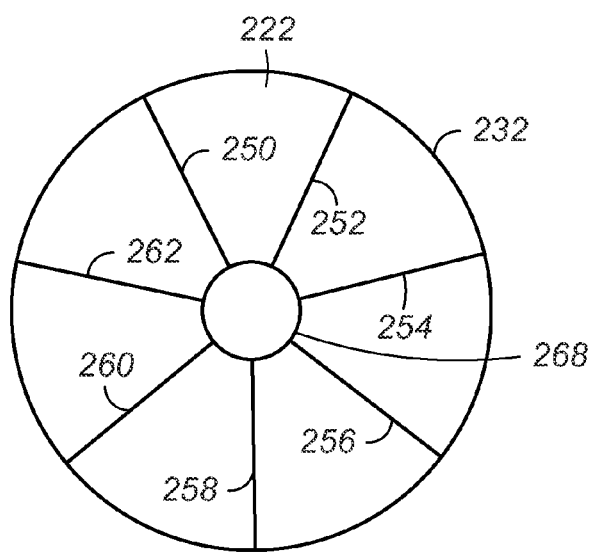
FIG. 7 is a top, plan view of an exemplary spillway having one or more vanes therein.

Referring to FIGS. 3 and 7, a conduit can be empty or include one or more devices to facilitate mixing such as one or more vanes or a static mixer to further increase vapor-liquid contacting. One or more vanes, namely a first vane 250, a second vane 252, a third vane 254, a fourth vane 256, a fifth vane 258, a sixth vane 260 and a seventh vane 262, can be positioned in a conduit 232 proximate to a spillway 222. The one or more vanes can be formed from a flat plate or coupled using any simple means such as welds or mechanical fasteners to a core 268. In this exemplary embodiment, the core 268 can be substantially circular. In this matter, the vanes 250, 252, 254, 256, 258, 260, and 262 can extend any suitable distance within the conduit 232 to facilitate mixing of the fluids. Moreover, the one or more vanes may be positioned at any desired location in a conduit, such as proximate to, e.g., a spillway 222 or a hole 282.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for contacting one or more fluids in a vessel, comprising:
   A) passing one or more fluids radially inwardly into a chamber from an overhead tray wherein the chamber forms one or more sidewalls, the chamber is below the overhead tray, the sidewalls form at least one hole and the overhead tray forms at least one spillway; and
   B) providing a conduit radially outside the chamber coupling a respective spillway to a respective hole for increasing contact time and area inside the conduit and the chamber.

2. The process according to claim 1, wherein the one or more fluids comprises a liquid and a vapor.

3. The process according to claim 1, wherein the chamber comprises a bottom member forming an opening wherein the opening is surrounded by a weir.

4. The process according to claim 3, wherein the bottom member forms a periphery.

5. The process according to claim 4, wherein the chamber forms a substantially right circular cylinder.

6. The process according to claim 1, wherein the conduit comprises a first arm and a second arm coupled at an elbow.

7. The process according to claim 6, wherein the elbow forms a substantially 90° angle between the first arm and the second arm.

8. The process according to claim 7, wherein the conduit forms a bend.

9. The process according to claim 1, wherein the overhead tray is substantially circular.

10. The process according to claim 1, wherein the vessel comprises a plurality of conduits.

11. The process according to claim 1, further comprising positioning one or more vanes in the conduit.

12. The process according to claim 1, wherein the vessel comprises a reactor.

* * * * *